July 20, 1965 P. H. METZLER 3,195,262
QUICK-RELEASE BOTTOM FISHING SINKER
Filed May 21, 1962 2 Sheets-Sheet 1

INVENTOR.
PHARES H. METZLER
BY
Reynolds & Christensen
ATTORNEYS

July 20, 1965 P. H. METZLER 3,195,262
QUICK-RELEASE BOTTOM FISHING SINKER
Filed May 21, 1962 2 Sheets-Sheet 2

INVENTOR.
PHARES H. METZLER
BY
Reynolds & Christensen
ATTORNEYS

United States Patent Office 3,195,262
Patented July 20, 1965

3,195,262
QUICK-RELEASE BOTTOM FISHING SINKER
Phares H. Metzler, 12999 Standering Lane,
Seattle 66, Wash.
Filed May 21, 1962, Ser. No. 196,099
7 Claims. (Cl. 43—43.12)

This invention relates generally to fishing sinkers. More particularly, it relates to sinkers of the quick-release type frequently used for bottom fishing in flowing waters, such as surf casting for bass and "plunking" in streams for steel-head trout. Although the invention is herein illustratively described in terms of certain presently preferred forms thereof, it will be recognized that various changes and modifications therein are possible without departing from the essential features involved.

In stream fishing or "plunking," for example, sinkers are used which may be cast toward the center of a stream and allowed to rest on the bottom while the baited leader trails downstream. This type of fishing presents peculiar problems with regard to types of sinkers used. A sinker is required which is not only of the proper weight for casting, but which will either stay in one place against the current, or skip along the bottom, while allowing the baited leader to trail down-current. Such sinkers frequently come in contact with jagged rocks and other impediments and often become entangled on the bottom. When this occurs, attempts to free the sinker from the bottom may result in breaking the fishing line. To prevent loss of the line, leader and lure, a safe-release type sinker is required which will release itself from the line in response to predetermined line tension. Further it is desirable to provide a releasable sinker connection permitting interchange of sinkers of differing weights quickly and easily without knot tying.

It is a broad object of this invention to provide an improvement in bottom fishing sinkers of the safe-release type. A more specific object hereof is to provide in such a sinker a release mechanism which will allow disengagement of the sinker body from the line in response to a substantial pull on the line in any of different directions. It is comparatively easy to provide detent fasteners which will release in response to axial pull; however, this invention provides a safe-release sinker detent fastener which also releases in any of different transverse directions of pull.

A further object of this invention is to provide means for securing such sinkers to fishing lines which means permit quick and convenient manual attachment and detachment of sinker bodies of graduated weights and various selected shapes.

Another object of this invention is to provide a bottom fishing sinker of simple form to permit ease and low cost of manufacture. A related object is to provide a safe-release type bottom fishing sinker having a body into which no separate detent element of different material need be cast, but one which may be cast in one piece and of one material throughout.

An additional object is to provide a sinker of the type mentioned having greater reliability by virtue of an improved non-failing securement to the line and freedom from corrosion and "freezing" of detent elements.

In accordance with this invention a sinker body is formed having specially inclined bearing surface portions or edges which cooperate with a spring wire bail to accomplish releasable attachment to the line. These surface portions include pairs of mutually inclined zones of gripping contact aligned in a common gripping plane and from each of which diverge adjoining bearing surface portions. These surface portions comprise either external surfaces of the sinker body, or the surfaces of a hole within the body. Securing the sinker body releasably to the fishing line is a wire bail having a pair of legs or tines. These tines are formed to resiliently bear against the zones of gripping contact on the sinker body.

Gripping force in the bail bearing resiliently against the zones of gripping contact is great enough to withstand normal jerking action in casting but to release therefrom in response to a predetermined line pull less than the tested strength of the line. Moreover, in the case of a pull transverse to the gripping plane, the shape of the aforementioned surfaces causes deflection and release of the tines from gripping position. The edges of the diverging surface portions are positioned and inclined with respect to each other to result in a fulcruming action deflecting the legs of the bail in opposite directions in response to such transverse pull, causing their disengagement from the sinker body. In like manner a predetermined transverse pull on the bail in any other plane also causes its release from the sinker body by fulcruming of one leg of the bail on the adjacent edge accompanied by change of spacing between the legs in a direction effecting release of the bail.

In certain forms of the invention the bail legs are provided with jogged or bent end portions defining opposing teeth. In such forms the opposing teeth of the bail legs grip corresponding edges of the aforementioned surface portions adapted to receive them. The fulcruming action caused by a transverse pull on the line displaces these teeth from the gripped edges, thereby releasing the sinker body from the bail.

These and other features, objects and advantages hereof will become more apparent from the following more detailed description, taken in connection with the accompanying drawings which illustrate certain presently preferred forms of the invention.

Figure 1:
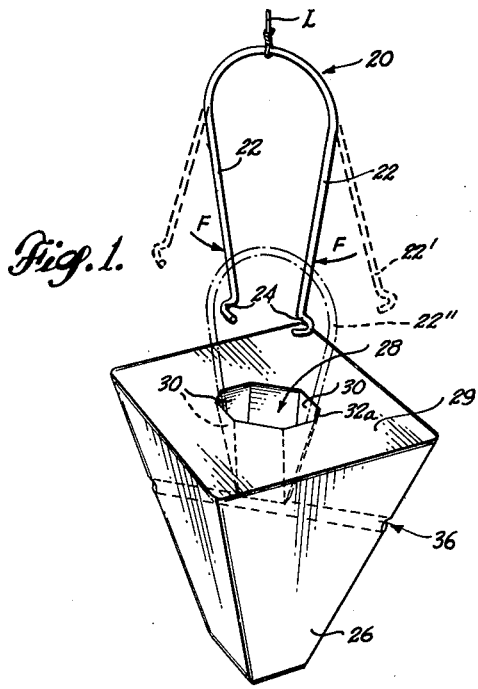
FIGURE 1 is a perspective view of a preferred form of releasable sinker body incorporating the invention and showing the line-receiving bail disassembled therefrom. Dotted lines in this view indicate the form taken by the bail when assembled and when disassembled with no compressive force applied.

The invention is a two-piece mechanism. In FIGURE 1 its two parts are shown in disassembled relationship for a preferred embodiment. The bail 20 is tied to a leader L which is in turn attached to a fishing line (not shown) and ultimately to a rod held by the fisherman using the invention. The bail 20 comprises an elongated resilient wire formed generally in the shape of a U. The legs or tines 22 are generally straight, lying in a common plane, and are of equal length having at their respective ends opposing jogged portions or teeth 24. These opposing teeth 24 project laterally outward in the plane of the bail and are formed by a double bend in the end of the wire as shown. In its relaxed condition detached from the body the bail takes the form 22′ shown by dotted lines. When the bail is gripped for insertion into the sinker body 26 the gripping force F causes it to take the form of a horseshoe, as shown. Dot-dash lines indicate its gripping position 22″ when inserted into the sinker body. The bail is formed from stainless spring steel or spring brass wire in order to prevent corrosion and "freezing" of the bail to the sinker body when used in salt water. If the spring weakens through repeated flexing, its gripping power may be restored by simply bending the same into its spread position 22′.

The sinker body 26 is manufactured by casting lead alloy for the weight and hardness required in the proper form as shown. Although preferred, its external pyramidical shape is not critical to the invention. Any form permitting ease of manufacture is suitable. It is desirable to provide a body shape which in most applications permit it to remain in one position on the bottom against the force of currents but which minimizes the likelihood of the sinker body becoming entangled in debris on the stream, lake or ocean bottom.

The invention herein resides in the essentially critical cooperative relationship between the bail described above and certain bearing surfaces and edges specially formed on or within the sinker body. In the embodiment illustrated in FIGURES 1 to 4, the critical surfaces define hole 28 formed centrally in the upper surface 29 of the sinker body 26. The four surfaces 30 are inclined both vertically of the sinker body and with respect to each other to partially define the pyramid-shaped hole 28. The hole 28 is further defined by a pair of truncating surfaces 34 which intersect the upper surface 29 of the sinker body along opposing parallel lines defining edges 34a. These surfaces 34 are inclined toward each other downwardly of the sinker body and intersect elongate hole 36 at the apex of the pyramidical hole 28 internally of the body.

This hole 36 is cast or drilled generally diagonally of the sinker body 26 and parallel to the upper surface 29 thereof, having a relatively small diameter with respect to its length.

The relatively narrow truncating surfaces 32 further defining the pyramidical hole 28 are inclined toward each other along the virtual intersection of bearing surfaces 30. These narrow surfaces mutually inclined in a common bail-contact plane terminate in bail-contact zones or edges 32a at the upper surface 29 and in locking edges 32b at their junction with hole 36. The contact plane in this embodiment is oriented diagonally of the sinker body parallel to the elongate hole 36.

Figure 2:
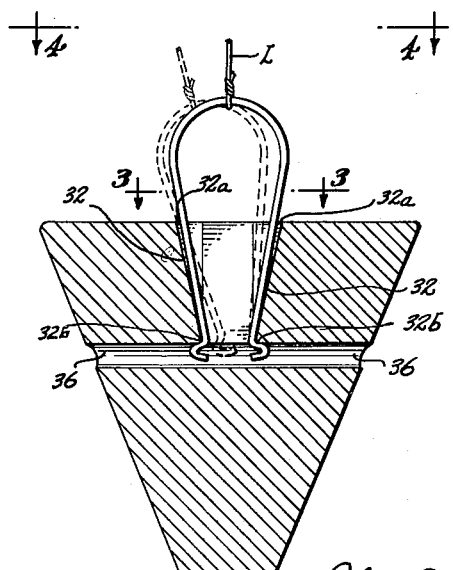
FIGURE 2 is a transverse sectional view taken on a diagonal mid-plane of the sinker shown in FIGURE 1, such view being taken on line 2—2 of FIGURE 4, showing the releasable bail in gripping position.

The invention is assembled by compressing the wire bail to its horseshoe like form 22 as indicated by the force arrows F, and inserting the same into the sinker body. The jogs or teeth 24 of the bail engage surfaces 32 as the bail is inserted and are thereby guided to gripping position 22″. In this position, as illustrated in FIGURE 2, teeth 24 overlap opposing locking edges 32b and protrude into elongate hole 36. The sinker body is thus secured to the line by resilient gripping action of the bail legs. The gripping action must be sufficient to withstand the shock or jerk occurring when the line is cast, although nylon lines normally used absorb a portion of such shocks.

A normal direct pull on the line L directly away from the sinker body which causes approximately equal bearing pressure of the teeth 24 against edges 32a will not result in disengagement of the bail from the body. Thus it is virtually impossible for the sinker to become detached from the line during normal fishing operation. However, should the sinker body become entangled in rocks or debris, the bail may be easily freed from the entangled sinker body simply by pulling on the line with sufficient force. The bail and cooperating contact surfaces and edges are constructed to allow the bail to release itself in response to a predetermined amount of force on the line. The critical release force is gauged below the tensile strength of the line and leaders used to prevent breakage theerof and consequent loss of equipment. Therefore, in response to such an amount of pull on the line the teeth 24 slip from locking edges 32d to free the bail and line from the entangled body. The bail may then be drawn to the surface to be used with another sinker body provided with the same attaching means.

When the entanglement of the sinker body is such that the pull on the line is in a direction transverse to the normal disposition of the line with respect to the sinker body and yet in the normal contact plane of the bail, the releasing action involved is slightly different from that when the pull is direct. In this case, as is illustrated in FIGURE 2, the pull in the plane of the bail at less than a right angle to the upper surface 29 of the sinker body, the bail is released by a fulcruming action of one of the bail legs 22 against contact edge 32a. The tooth 24 is thereby released from the locking edge 32b and the bail consequently is freed from the sinker body.

Figure 3:
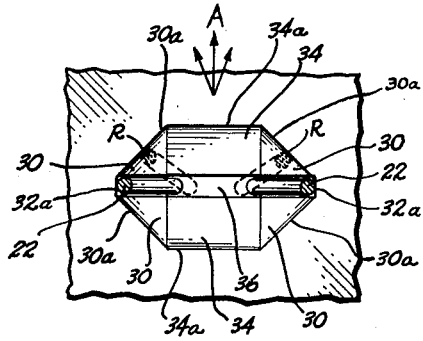
FIGURE 3 is an enlarged fragmentary top view of the sinker taken on line 3—3 of FIGURE 2.
Figure 4:
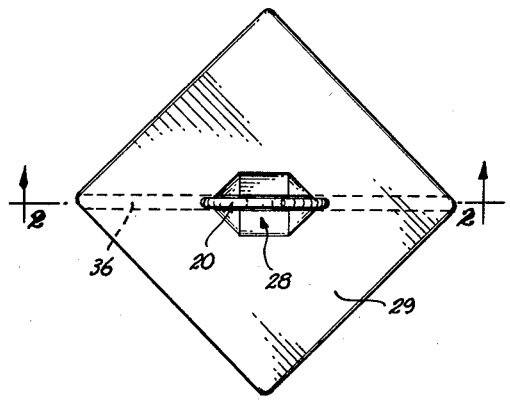
FIGURE 4 is a top view of the sinker shown in FIGURE 1.

In the event that the sinker body is caught so that the pull on the line is in a direction transverse to the contact plane, as symbolized by arrows A in FIGURE 3, the releasing action comprises another fulcruming operation. Such a pull causes tilting of the bail with respect to the sinker body to an inclined position R. Legs 22 thus bear against the converging bail-release edges 30a of surfaces 30, which edges act as fulcrums as legs 22 are further tilted, while pivoting on locking edges 32b, so that teeth 24 are pinched together and released from locking edges 32b.

Therefore, regardless of the direction of pull on the line after entanglement of the sinker body in rocks or debris, the fisherman need not change his position in order to achieve any particular direction of pull. The sinker is easily released by a pull in any direction substantially away from or parallel to the upper surface of the sinker body.

Figure 5:
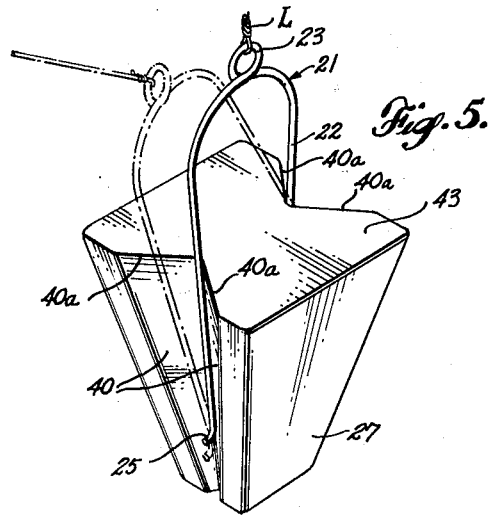
FIGURE 5 is a perspective view of an alternative form of the invention showing an alternative form of releasable bail in gripping position, with dotted lines indicating an intermediate position of the bail during disengagement from the sinker body.
Figure 6:
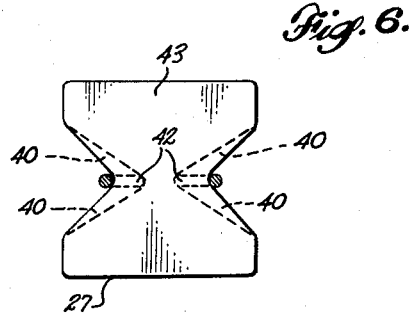
FIGURE 6 is a top view of the sinker shown in FIGURE 5 with the bail partially cut away and dotted lines added to indicate the disposition of the bearing surfaces.

A second preferred embodiment of the invention, illustrated in FIGURES 5 and 6, utilizes the same principles in a somewhat reversed manner. In this case, the bail 21 is incidentally provided with a line-securing ring 23 at its apex. Such a ring may be provided on the bail previously described and has the advantage of assuring maximum leverage for transverse pulls on the bail, as well as decreasing the likelihood of losing the bail itself. In addition, the legs 22 are merely flared outwardly at the ends 25, in place of having jogs or teeth.

The body 27 is formed having its zones of gripping contact on the outside thereof to cooperate with the bail. Two pairs of bearing surfaces 40 respectively converge into opposite sides and downwardly of the body as shown to form mutually inclined bail-contact zones 42 converging downwardly in a common contact plane. Partially formed on the outside by these surfaces, the solid body is of generally pyramidical form as before. At the upper surface 43 of the body pairs of fulcruming edges 40a diverge in opposite directions transverse to the contact plane.

The bail 21 is disengaged from the sinker body 27 by a force in any direction sufficient to overcome the resilient gripping action of the bail, which gripping force is pre-set at a value less than the ultimate tensile strength of the lines and leaders to be used therewith. Again in response to such force in any of different directions away from the upper surface, or even parallel thereto, a fulcruming action takes place between at least one bail leg and the corresponding fulcruming edge 40a to cause the deflecting action. During the fulcruming action the legs pivot at terminal portions 25, transverse movement of which is restricted by convergence of surfaces 40 toward the zones of contact of the terminal portions. A particular additional advantage of this embodiment is its extreme simplicity and resulting ease of manufacture.

Figure 8:
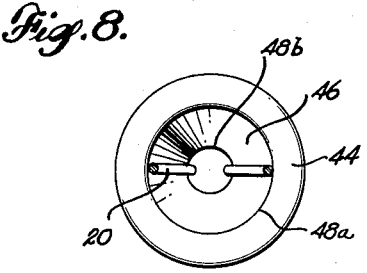
FIGURE 8 is a top view of the embodiment shown in FIGURE 7, with a portion of the bail cut away to reveal the novel mode of gripping.
Figure 7:
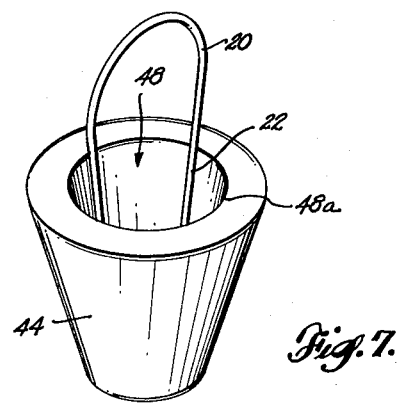
FIGURE 7 is a perspective view of a second alternative form of the invention showing the releasable bail in gripping position.
Figure 9:
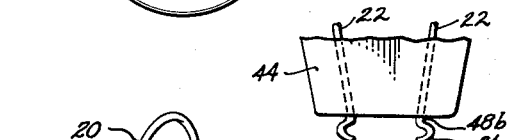
FIGURE 9 is a fragmentary side view showing the bottom portion of the embodiment of FIGURE 7 to further disclose the mode of gripping.

A third embodiment of the invention is shown in FIGURES 7, 8 and 9. The bearing surface 46 defining the zones of gripping contact in this form is entirely conical, forming the hole 48 through the body, and the bail 20 is of the same general type as that illustrated in the first embodiment. The outside of the body 44 itself is of conical form, although a conical internal bearing surface 46 may be utilized in a body of any external form. The hole 48 passes vertically entirely through the body 44, forming the circular fulcruming edge 48a at the upper surface thereof and the circular locking edge 48b at the lower surface. When the sinker is assembled, legs 22 of the bail 20 resiliently engage the bearing surface 46 at least near its edges 48a and 48b at contact points lying on any pair of an infinite number of mutually inclined lines opposing each other in a common contact plane. The teeth or jogs 24 emerge from the bottom of the sinker body to grip circular locking edge 48b.

The releasing action for this embodiment is the same as that first described. The bail will release in response to a predetermined direct pull on the fishing line (not shown), or in response to a pull of sufficient force in a direction transverse to the normal position of the line. Any two corresponding portions of the circular bail-release edge 48a on the same side of the bail converge so that in response to such transverse pull the legs 22 of the bail are pinched together by fulcruming action so that the teeth 24 are released from circular locking edge 48b. It will be noted that any two corresponding portions of circular locking edge 48b converge also to restrict transverse movement of the terminal portions of the bail to facilitate pivoting of the legs thereon during fulcruming action. This form of the invention and the one next to be described also have the advantage of extreme simplicity of manufacture.

Figure 10:
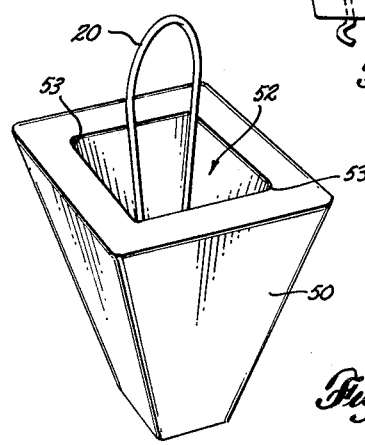
FIGURE 10 is a perspective view of a third alternative form of the invention showing the releasable bail in gripping position.
Figure 11:
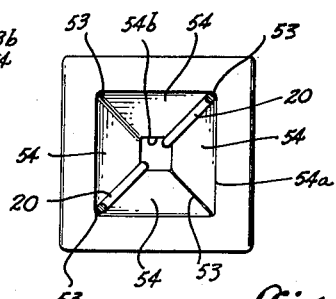
FIGURE 11 is a top view of the embodiment of FIGURE 10 with a portion of the releasable bail cut away to reveal the mode of gripping.

A fourth embodiment of the invention is illustrated in FIGURES 10 and 11. Again the bail 20 is identical to that used in the first embodiment. The sinker body 50 is formed having a generally pyramidical shape both inside and out, the hole 52 passing entirely through the body 50 as in the embodiment just described. Two identical pairs of downwardly converging bail-contact regions 53 are formed in mutually perpendicular contact planes by two pairs of downwardly converging internal surfaces 54 as shown. The openings at the upper and lower surfaces of the body are generally square in form, adjacent edges thereof respectively defining pairs of fulcruming edges 54a and bail-locking edges 54b, respectively.

The release mechanism of this invention is capable of incorporation into a family of fishing sinker bodies having a variety of different shapes for different purposes, as well as a wide range of different weights for different depths and currents. Since the required release force will be the same regardless of the size of sinker body, bails may be provided of sufficient resilient strength to carry large weights and still be used for small ones. This novel release mechanism eliminates the need for retying the leader in the event of either loss of the sinker body or of changes to other sizes when desired.

The sinker bodies provided by this invention are of extreme simplicty and low cost of manufacture. They therefore reduce the cost of fishing by methods utilizing bottom sinkers, both by reducing the likelihood of losing greater amounts of equipment because of entangled bottom sinkers and by providing low-cost replacements for the sinker bodies lost.

It will be recognized that many other variations and modifications of these forms of bails and sinker bodies are possible within the scope of this invention. The invention resides in the employment of converging or diverging pairs of bearing surfaces or edges on the sinker body in cooperation with a spring-type bail to accomplish a fulcruming action to release the bail from the body in the event of pull on the fishing line in any of the different directions. The particular forms of the invention herein chosen for illustration are therefore not to be taken as restrictive.

I claim as my invention:

1. A releasable bail fishing sinker comprising an open-end resilient wire bail having a line securing portion and a pair of transversely spaced legs extending therefrom in a common plane and having opposing terminal portions, and a sinker body gripped by said bail in a normal plane of contact therewith, said body having surfaces defining: first contact zones lying in the contact plane and contacted by said terminal portions, pairs of bail-lock surface portions converting oppositely toward each of the first contact zones in a second plane transverse to the contact plane to restrict transverse movement of the terminal portions second contact zones lying in the contact plane and contacted by intermediate portions of said legs, pairs of bail-release edge portions converging oppositely toward each of the second contact zones in a third plane spaced from the second plane and also transverse to the contact plane, the bail-release edge portions on each side of the contact plane being inclined toward one another whereby, in response to a force causing transverse movement of the bail from the contact plane, the bail legs act as lever arms, the terminal portions pivoting on the first contact zones with transverse movement thereof restricted by the bail-lock surface portions, while the intermediate portions fulcrum oppositely about the bail-release edge portions to pry the terminal portions from the first contact zones and release the bail from the body.

2. The fishing sinker defined in claim 1 wherein said contact zones define external surfaces of said sinker body, said fulcruming action deflecting the terminal portions of said legs oppositely away from said body to release the same.

3. The fishing sinker defined in claim 1 wherein the terminal portions of said legs are jogged oppositely to form opposing teeth thereon, and wherein said first contact zones and converging bail-lock surface portions comprise locking edges engageable by said teeth, the fulcruming action deflecting said teeth from said locking edges to release the bail from the sinker body.

4. The fishing sinker defined in claim 3 wherein said contact zones define surface portions of a hole in said sinker body.

5. The fishing sinker defined in claim 4 wherein said hole comprises a generally conical form, said first and second contact zones defining edges of said hole.

6. The fishing sinker defined in claim 4 wherein said hole comprises a generally pyramid-like form.

7. The fishing sinker defined in claim 4 wherein said locking edges are defined by intersection of said first-mentioned hole internally of said body with a second hole therin transverse to said first-mentioned hole.

References Cited by the Examiner

UNITED STATES PATENTS

| | | | |
|---|---|---|---|
| 617,236 | 1/99 | Dougherty | 43—44.88 |
| 1,564,147 | 12/25 | Stickley et al. | 43—43.12 |
| 2,017,903 | 10/35 | Johnson | 43—42.04 |
| 2,958,976 | 11/60 | Adams | 43—43.12 |
| 3,004,319 | 10/61 | Hennon | 43—44.83 X |
| 3,011,478 | 12/61 | Kirby | 119—106 |

ABRAHAM G. STONE, *Primary Examiner.*